UNITED STATES PATENT OFFICE.

CHESTER B. DURYEA, OF CARDINAL, ONTARIO, CANADA.

MANUFACTURE OF GLUCOSE.

No. 916,684.　　　　Specification of Letters Patent.　　　Patented March 30, 1909.

Application filed March 20, 1907. Serial No. 363,447.

*To all whom it may concern:*

Be it known that I, CHESTER B. DURYEA, a citizen of the United States, and resident of Cardinal, in the county of Grenville, Province of Ontario, Canada, have invented a new and useful Manufacture of Glucose, of which the following is a specification.

My present invention relates to the manufacture of glucose with the object of providing for the manufacture of the highest possible grades of saccharification products which, under commercial conditions, starch and starchy materials are capable of yielding by means of acid hydrolysis. Heretofore, (with special reference to starch from maize) the relative amounts and character of the nitrogenous impurities associated with the unmodified green starch converted have been very serious obstacles in the way of producing glucose of eminent quality. Moreover, the employment of ordinary thick boiling starch as the saccharification base, necessarily involves very irrational conversion details. At the initial concentration required such unmodified starches yield pastes so excessively viscous and even doughy, that introduction under converting conditions must be gradual, *i. e.*, little by little continuously and at a rate no greater than that which will permit the fluidification of the starch milk preceding, before that following gelatinizes. Not only this, but as an additional necessary aid to the introduction of the charge, it is customary to have all of the converting acid in the converter boiling and in a relatively concentrated state before and during the gradual running in of the starch milk, as hereinbefore described. This abnormal method of conversion results in over, under and mean conversion products, in part to an extent which may be represented by a relation which the time of introduction of a charge of starch bears to the subsequent time of conversion on a basis of equal temperature throughout, and in part to the extent of retrogressive overconversion resulting from the excessive strength of the acid at the beginning and up to the time of complete introduction of the charge. The overconversion affects both carbohydrates and proteins leading in the case of the former to the formation of reversion and torrefaction products (for instance, so-called gallisin and caramel, respectively), and as regards the proteins to the excessive development of very soluble substances including amino-acids, all of which, notwithstanding elaborate and very expensive refining, largely remain in the finished products to their serious detriment. Further, because of the use of unmodified starch with its associated impurities relatively large proportions of acid are needed for conversion and as the present general practice is to use hydrochloric acid for this purpose an undesirably large percentage of neutralization product (common salt) is found in the glucose. The irrational raw material and associated conversion method have additional disadvantages.

My new process may be briefly described as follows:— Ordinary green starch is modified by subjecting the granules at sub-gelatinizing temperatures to limited acid hydrolysis. See my United States Letters Patent No. 675822, granted to me June 4, 1901. This treatment, in addition to rendering the starch potentially thinner boiling to the requisite extent without serious carbohydrate loss, also affects the proteins hydrolyzing them in part to soluble products easily separable from the modified granules by means of simple washing, and concurrently, the nitrogenous bodies more resistant to acid hydrolysis, still remaining insoluble have been brought into a physical condition very favorable to their separation from the starch granules now free swimming in the general menstruum. This separation may be effected by means of subjecting the modified starch charges greatly diluted with water to the well known treatment of passing over starch-house tables or runs. The tabling process simultaneously also brings about a great reduction in the amount of soluble nitrogenous matter in relation to the weight of the starch. The suitably modified starch is now so thin boiling that a normal conversion is practicable. That is, the starch milk for a conversion charge may be acidified and gelatinized *en masse* and the saccharification conversion started and completed in such wise that all of the starch, the remaining impurities and their progressive decomposition products shall be subjected to hydrolyzing influences for the same length of time concurrently and homogeneously. Moreover, because of the modification of the starch and its peculiar purity relatively mild converting conditions are sufficient for saccharification requirements, additional advantages leading to great organic and inorganic purity of the finished products through simple and economical refining means.

For comparison, the differences in the steps between the old and the new processes, may be summarized thus:—

| Old Process. | New Process. |
|---|---|
| 1. Crude base. | 1. Crude base. |
| 2. Conversion. | 2. Modification of base. |
| (Abnormal). | 3. Refining. |
| 3. Neutralization. | 4. Conversion. |
| 4. Refining. | (Normal). |
| (Extravagant). | 5. Neutralization. |
| 5. Concentration. | 6. Refining. |
| 6. Product. | (Economical). |
| (Indifferent purity). | 7. Concentration. |
| | 8. Product. |
| | (Super-purity). |

In practice, operating upon maize starch for example and beginning from the deposition of crude starch upon the primary runs or tables my procedure may be stated as follows:—The crude base is modified by means of acid hydrolysis (see my U. S. Patent No. 675822), at a gravity of about 20° Baumé or somewhat higher. Purification follows, preferably by means of dilution and retabling at a gravity of about 4° Baumé, as hereinbefore described. The extent of the modification may advantageously be such that when the now artificially thin-boiling starch granules are incorporated with water so as to form a suspension of about 16° Baumé, the application of gelatinizing temperature will yield pastes or semi-solutions so moderate in viscosity that masses thereof may be effectively stirred or agitated mechanically on a practical glucose scale. Charges of such suspended starch having incorporated therewith suitable acid of an appropriate strength, for instance, hydrochloric acid of about 0.05% by weight on the total water present, are converted preferably normally or *en masse* under about thirty pounds steam pressure and temperature for about thirty minutes depending upon the extent of the saccharification desired. It is advantageous to acidify the suspended starch in a special tank provided with an agitator and also to raise the temperature therein after acidification to nearly the gelatinization point (by means of closed coils) before introduction into the converter. The process may be then proceeded with in a converter of the usual type in which case a portion of the water necessary to provide for the desired gravity of the "light liquors", reserved for the purpose from the starch suspension hereinabove referred to, is introduced therein and boiled. The hot acidified starch charge may then be rapidly introduced at atmospheric pressure while boiling is maintained. As soon as the charge is in, the pressure is raised, the conversion completed and the charge blown out into the neutralizer. A more strictly normal conversion, however, may be conducted in a converter furnished with internal agitators. In connection with this, the suspended starch is introduced before gelatinization. The agitators need be operated only briefly during the beginning of the conversion, i. e. until the granules have become gelantinized and the charge freely fluid. Or, the old type of converter may be used and the acidified suspended charge gelatinized and even heated to boiling in the auxiliary agitator and closed coil heating tank heretofore mentioned, before transferring to the empty converter and placing under main saccharification conditions. Inherently, the two latter methods require a somewhat higher preliminary starch modification than the first. After saccharification, the charges may be neutralized in the customary manner, filter pressed and the resulting light liquors of unparalleled purity and general excellence may be refined and concentrated at reduced expense by well known and established ways and means.

What I claim is:—

1. The process of manufacturing glucose consisting in providing thin boiling or modified starch by acid hydrolysis, at a gravity of about 20° Baumé, and at a temperature of about 55° C. whereby the impurities are in a state to be readily separated from the starch; separating the impurities from the modified starch, for instance, by subjecting the starch charges diluted with water to about 4° Baumé to the well known treatment of passing over starch-house tables, or runs; converting the purified, modified starch, in suspension with water at a gravity of about 16° Baumé, by rendering it acid, for instance, hydrochloric acid in the proportion of about 0.05% by weight on the total water present and submitting it to about 30 lbs. steam pressure for about thirty minutes; neutralizing the charge and finally refining and concentrating the product.

2. The process of manufacturing glucose consisting in providing thin boiling or modified starch by acid hydrolysis at an elevated temperature whereby the impurities are in a state to be readily separated from the starch; separating the impurities from the modified starch; converting the purified, modified starch suspended in water by rendering it acid and submitting it to an elevated temperature under pressure; neutralizing the charge and finally refining and concentrating the product, substantially as specified.

3. The process of manufacturing glucose consisting in providing a thin boiling or modified starch of a definite character in which the impurities are in a state to be readily separated from the starch, separating the impurities from the modified starch; converting the purified, modified starch by heating with dilute acid so that in the main converting influences act concurrently and uniformly throughout the entire mass and finally neutralizing, refining and concentrating the product, substantially as specified.

4. The process of manufacturing glucose consisting in providing a thin boiling or modified starch, by acid hydrolysis, at a high specific gravity and elevated temperature in which the impurities are in a state to be readily separated from the starch; separating the impurities from the modified starch; converting the purified, modified starch by heating it with dilute acid under pressure so that in the main converting influences act concurrently and uniformly throughout the entire mass and finally neutralizing, refining and concentrating the product, substantially as specified.

In testimony, that I claim the foregoing as my invention, I have signed my name in presence of two witnesses, this 15th day of March, 1907.

CHESTER B. DURYEA.

Witnesses:
C. S. SUNDGREN,
HENRY THIEME.